United States Patent [19]

Flemmert

[11] Patent Number: 4,572,827
[45] Date of Patent: Feb. 25, 1986

[54] PROCESS FOR PREPARING FINELY-DIVIDED SILICON DIOXIDE IN GOOD YIELD

[76] Inventor: Gosta Flemmert, Agaresgatan 38, 269 00 Bastad, Sweden

[21] Appl. No.: 594,150

[22] Filed: Oct. 18, 1984

Related U.S. Application Data

[63] Continuation of Ser. No. 328,287, Dec. 7, 1981, abandoned.

[30] Foreign Application Priority Data

Dec. 12, 1980 [SE] Sweden .................................. 8008769

[51] Int. Cl.[4] .......................................... C01B 33/182
[52] U.S. Cl. ...................................... 423/336; 423/337
[58] Field of Search ................................ 423/336, 337

[56] References Cited

U.S. PATENT DOCUMENTS 3,645,684  2/1972  De Cuir ............................. 423/336
4,036,938  7/1977  Reed ............................. 423/336 X Primary Examiner—Jack Cooper

[57] ABSTRACT

Process and apparatus are provided for preparing finely-divided silicon dioxide in good yield by reaction of silicon fluoride in the vapor phase with water vapor, combustible gas and free oxygen-containing gas in a flame reaction zone to form hydrogen fluoride and silicon dioxide entrained in a gaseous reaction mixture; withdrawing the gaseous reaction mixture from the flame reaction zone; and then immediately and rapidly cooling the gaseous reaction mixture and entrained silicon dioxide to a temperature below 700° C. by passing the gaseous reaction mixture in a turbulent flow at a Reynolds number above 300 under constraint through a straight narrow passage in alignment with the gas flow, the passage having a diameter within the range from about 20 to about 150 mm and smooth walls constituting a cooling surface.

7 Claims, 1 Drawing Figure

U.S. Patent  Feb. 25, 1986  4,572,827
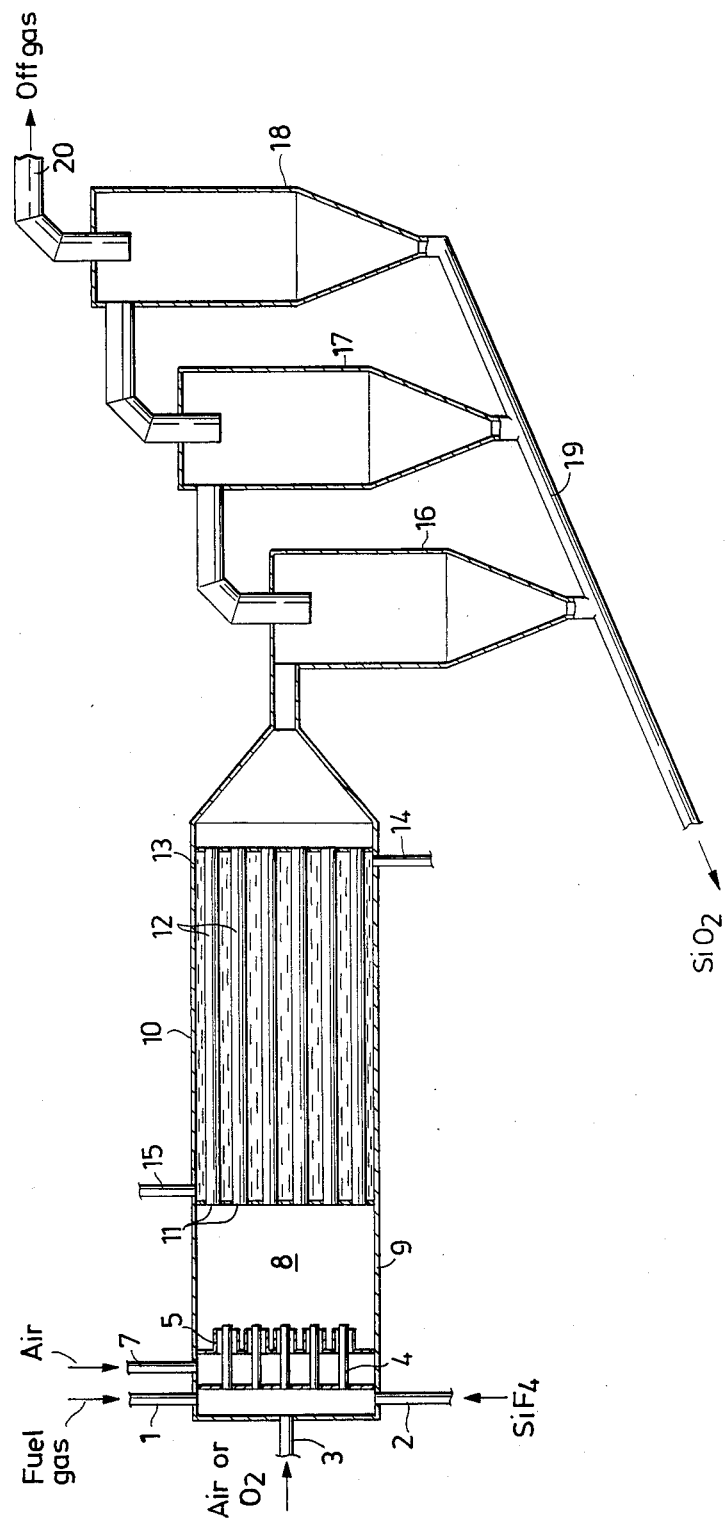

PROCESS FOR PREPARING FINELY-DIVIDED SILICON DIOXIDE IN GOOD YIELD

This is a continuation of application Ser. No. 328,287, filed Dec. 7, 1981, now abandoned.

The combustion process employed to prepare silica of pigment grade involves burning volatile silicon compounds in air or oxygen in the flame of a combustible gas such as coal gas or water gas, oxygen being used to oxidize the silicon compound. This process is described in British Pat. Nos. 258,313, dated Sept. 15, 1926 and 438,782 dated Nov. 22, 1935. Silica is formed according to the following reaction, in which silicon tetrafluoride and methane, a component of coal gas, are indicated as exemplary:

$$SiF_4 + CH_4 + 2O_2 \rightarrow SiO_2 + CO_2 + 4HF$$

This reaction does not present the difficulty in a vapor phase hydrolysis of achieving a sufficiently high reaction temperature, inasmuch as heat is supplied to the reaction mixture by the combustion, which is exothermic.

However, in this combustion reaction, it is difficult to control the particle size of the silica. In fact, if the burning is carried out under normal circumstances without more than an ordinary control of the flame intensity, the silica will be relatively dense and will have a mean particle size appreciably in excess of 100 nm, up to 400 nm and more. The smallest mean particle size claimed in the British Pat. No. 258,313 is 150 nm. This of course is too large for a satisfactory reinforcing agent for rubber. At the same time the yield is as low as 10 to 40% of theoretical. This means that the product obtained is unsatisfactory for the most important applications, such as use as a rubber filler and as a thickening agent in greases, paints and lacquers, and at the same time the price will be relativey high, because of the low yield.

In Broughton, U.S. Pat. No. 2,535,036, dated Dec. 25, 1950, there is described a method for the manufacture of silica in amorphous finely-divided form of so-called pigment grade involving a vapor phase hydrolysis in accordance with the following equation:

$$SiF_4 + 2H_2O \rightleftharpoons SiO_2 + 4HF$$

The vapor phase hydrolysis has certain advantages over the liquid phase hydrolysis, as the Broughton patent points out. However, the hydrolysis is an endothermic reaction and requires the introduction of heat to achieve conversion of the tetrafluoride to silica. Also, it is essential to bring the reactants at least to 450° C. to effect a good reaction.

In this patent, no suggestion appears that it is possible to control the particle size of the silica. As a matter of fact, it is difficult in this reaction, too, to control the particle size of the silica within reasonably narrow limits. It is desirable when the silica is to be used as a reinforcing agent in rubber compounding that the silica have a mean particle size of 50 nm or less. A large proportion of the silica particles obtained in this vapor phase hydrolysis usually are as large as 400 nm and the mean particle size usually is of the order of 100 to 200 nm.

In accordance with Flemmert U.S. Pat. No. 2,819,151, patented Jan. 7, 1958, a silicon fluoride, a combustible gas and oxygen are reacted together in a flame, thereby forming silica and hydrogen fluoride. The flame intensity is increased beyond normal intensity so as to increase the temperature and decrease the converstion time. The flame intensity can be increased by various methods, which are described, and the intensity is controlled within specified limits so as to yield silica in the form of spherical amorphous particles having an arithmetic mean diameter within the range from about 5 to about 50 nm.

The reaction probably proceeds in certain zones of the flame. The intensity of the flame in these reaction zones is of primary importance in determining the particle size of the silica, and for this reason can be regarded as equivalent to the intensity of the reaction. However, the flame intensity in the reaction zones is difficult to measure except in terms of the heat liberated by the reaction, which of course is directly proportional to the heat liberated by the flame, and therefore for the purposes of the invention, the intensity of the reaction is measured by the intensity of the flame itself.

The intensity of the flame can be measured in terms of the amount of heat liberated per unit volume and per unit time, i.e., $$B.t.u./Cu.ft.min.$$

These quantities for the purposes of the invention are measured in British thermal units, abbreviated B.t.u., cubic feet and minutes. For convenience of representation, reciprocal B.t.u. units are used, i.e., $$1/B.t.u.$$

or $B.t.u.^{-1}$, and the terms "reciprocal B.t.u." and "$B.t.u.^{-1}$" will be understood to refer to the volume of the flame in cu. ft. for each B.t.u. evolved per minute in the flame.

Accordingly, in the Flemmert process the flame intensity is maintained within the range from about 0.1 to about $1.3 \times 10^{-5}$ $B.t.u.^{-1}$. This range lies essentially below the intensity of a normal flame in which silicon fluorides are subjected to the reaction in accordance with the invention. These intensity limits are critical, inasmuch as at flame intensities both above and below these limits the silica particle size again increases.

Another method of carrying out the reaction, as described in U.S. Pat. No. 2,535,036, is to mix in gaseous phase the silicon fluorine compound with superheated steam, whereby the fluorine compound is at least partly hydrolyzed, with the formation of finely divided silicon dioxide and hydrogen fluoride, according to the following reaction:

$$SiF_4 + n(2H_2O) \rightarrow SiO_2 + 4HF$$

where n is the multiplying factor by which the number of moles of water are multiplied when taken in excess of the stoichiometric molar amount, 2.

The thermodynamics of this reaction are such that it is quite difficult to carry out on a large scale, and thus it presents special problems usually not encountered with metal halides other than silicon fluorine compounds. The equilibrium constant for the above reaction has been calculated by F. A. Lanfesty, T. O. Farr and J. C. Brosheer (*Ind. Eng. Chem.* 44 1448 (1952) and I. G. Ryss (*J. Phys. Chem.* 14 571 (1940)). According to Lanfesty et al $$\log K_p = 5{,}547 - 6383/T$$

where $K_p$ is the equilibrium constant at atmospheric pressure and T is the absolute temperature. The variation of the equilibrium constant with the temperature is shown diagrammatically in FIG. 1. From the above equation for the equilibrium constant, the degree of conversion for the above reaction can be calculated according to methods well known in physical chemistry. Calculations have been carried out for different temperatures and with n in the above reaction being =1, =2 and =10, that is, with the stoichiometrically required amount of water vapor with 100% excess of water and with a 10-fold excess of water. High temperature and a large excess of water favor the conversion of silicon tetrafluoride to silicon dioxide. For example, 97% of the silicon tetrafluoride is converted at a temperature of 1000° C. if the excess of water is ten times larger than the amount which is required stoichiometrically, but the degree of conversion is only 43% when the stoichiometric amount of water is used. At a temperature of 400° C., the degree of conversion is 20% when n=10 and about 5% when n=1.

The calculations lead one to expect what actually occurs in practice, and constitutes an important obstacle to the commercial production on a large scale of finely-divided silicon dioxide from silicon fluorine compounds in the gaseous phase. If the gaseous reaction product mixture is cooled before separation of silicon dioxide and hydrogen fluoride, the reaction is reversed, and the finely-divided silicon dioxide which is formed at high temperatures now reacts with the hydrogen fluoride, regenerating silicon tetrafluoride according to the reaction $$SiO_2 + 4HF \rightleftharpoons SiF_4 + 2H_2O$$

This reverse reaction becomes significant at temperatures below 600° C., and increases in rate as the temperature drops. Experiments have shown that the finely-divided silicon dioxide, which has a very large surface area, rapidly reacts with the hydrogen fluoride at temperatures below 450° C. Thus, if the temperature of the reaction mixture is lowered between 600° C. by indirect cooling, the silicon dioxide will be converted to a great extent to silicon tetrafluoride, thus resulting in a low yield and an uneconomical process.

The reaction proceeds in the direction of silicon dioxide formation at 600° C. and over, and good yields of silicon dioxide can be obtained, but other difficulties arise. The gas containing hydrogen fluoride is highly corrosive at such high temperatures, and thus it is difficult to find a suitable construction material for the separators. In addition, the silicon dioxide particles are rapidly disproportionated at high temperatures, so that the larger particles grow larger whereas the smaller particles grow smaller and eventually disappear, so that a product of larger particle size is obtained which is less active and thus less valuable.

The difficulties described above have made it impossible to use silicon tetrafluoride and other silicon fluorine compounds in preparing finely divided silicon dioxide, though such silicon fluorine compounds are available in large quanties as cheap byproducts.

In accordance with the process described in Flemmert, U.S. Pat. No. 3,203,759, patented Aug. 31, 1965, silicon dioxide as obtained by the vapor phase reaction of silicon fluorine compounds and water can be maintained in active form as particles from 2 to 200 nm in size by diluting the mixture of gas byproducts and suspended silicon dioxide from the reaction zone with an inert gas having a low temperature than that of the reaction mixture and in an amount sufficient to reduce the reaction mixture temperature to below 600° C., and preferably to within the range from 350° to 575° C., but above the dew point of the diluted mixture. The silicon dioxide is then separated from the cooled diluted suspension. A good yield of high quality silicon dioxide is obtained, a surprising result in view of the reversibility of the reaction at such temperatures.

For cooling the reaction mixture, any inert gas can be used, i.e., any gas which will not react with any of the components desired to be recovered from the reaction mixture. Suitable gases are exemplified by air, water vapor, nitrogen, carbon dioxide, neon, helium, argon and like rare gases, and exhaust gases from combustion processes. The preferred diluent is the exhaust or by-product gases from the reaction after finely divided silicon dioxide has been separated therefrom, and they have been cooled to a suitable temperature, for the reason that no lowering of the concentration of the gaseous components occurs, thereby facilitating recovery of hydrogen fluoride and unreacted silicon tetrafluoride therefrom, if such be desired.

However, the process of U.S. Pat. No. 3,203,759 does not lend itself readily to the handling of high flow rates, and it is therefore difficult to achieve high production rates of silicon dioxide, above approximately 100 kg of silicon dioxide per hour in any unit. The cooling of the reaction product usually requires from three to four times the amount of cooling gas by volume of the reaction mixture, and handling this large gas volume in turn requires large and expensive equipment for separating and collecting the finely-divided silicon dioxide. Moreover, the holding time prior to separation of the silicon dioxide is prolonged considerably as the gas volume increases, which impairs both quality and yield.

Attempts have been made to cool the silicon dioxide-containing gaseous reaction mixture by using conventional gas coolers. However, the silicon dioxide has a tendency to adhere to the cooling surfaces, forming a layer diminishing the effectiveness of the heat transfer, and at the same time obstructing the gas flow, with the result that again the quality of the silicon dioxide becomes seriously impaired. Silicon dioxide adhering to the heat transfer surfaces is gradually converted to coarse hard particles or grits, which in time detach from the cooling surfaces and become mixed with the entrained silica, where they are not wanted because they detract from the desirable properties of the silica in many end-use applications.

In accordance with the process of the present invention, silicon dioxide of good quality and in good yield is prepared by reaction of silicon fluoride in the vapor phase with water vapor, combustible gas and free oxygen-containing gas in a flame reaction zone to form hydrogen fluoride and silicon dioxide entrained in a gaseous reaction mixture; withdrawing the gaseous reaction mixture from the flame reaction zone; and then immediately and rapidly cooling the gaseous reaction mixture and entrained silicon dioxide to a temperature below 700° C. by passing the gaseous reaction mixture in a turbulent flow at a Reynolds number above 300 under constraint through a straight narrow passage in alignment with the gas flow, the passage having a diameter within the range from about 20 to about 150 mm and smooth walls constituting a cooling surface.

The invention also provides apparatus for preparing silicon dioxide in good yield by the vapor phase hydrolysis of silicon tetrafluoride with water vapor comprising, in combination:

(1) a reactor defining a flame reaction zone including at least one burner, for reacting in the vapor phase silicon fluoride, a combustible gas and a free oxygen-containing gas to form a gaseous reaction mixture containing hydrogen fluoride and entrained silicon dioxide;

(2) means for supplying a feed of silicon fluoride, combustible gas and free oxygen-containing gas to the burner for generating the flame reaction zone;

(3) cooling means comprising a plurality of straight passages having a diameter within the range from about 20 to about 150 mm and smooth walls constituting cooling surfaces;

(4) means for passing gaseous reaction mixture containing silicon dioxide from the flame reaction zone through the passages on one side of the walls;

(5) means for passing cooling medium on the other side of the walls for maintaining the surfaces in contact with the gaseous mixture cool at a temperature below 700° C.;

(6) the length of the passages' cooling surfaces being sufficient at the selected gas flow rate to reduce the temperature of the gaseous reaction mixture and entrained silicon dioxide to below 700° C. during passage therethrough.

The gas flow is under constraint while passing through the passages, and by maintaining the flow turbulent at a Reynolds number above 300, deposition of the silicon dioxide on the cooling surfaces is prevented or largely inhibited. Deposition is also reduced by having the passage cooling surfaces smooth, i.e., substantially without any surface irregularities interfering with free flow of the gaseous mixture therethrough.

In the drawing:

The FIGURE shows an apparatus including a reactor and a battery of cyclone separators as well as a cooler in accordance with the invention, for carrying out the vapor phase hydrolysis of the silicon tetrafluoride to silicon dioxide, cooling the reaction mixture, and recovering the silicon dioxide.

For optimum yield, it is preferred that the gaseous reaction mixture and entrained silicon dioxide pass directly from the flame reaction zone to the cooler, so that the transit time between the flame reaction zone and the cooler is one second or less, and in any case is less than ten seconds.

The passages whose walls define cooling surfaces can be shaped as tubular, within tubes, or as elongated and narrow, as between plates, with straight or curved surfaces in the transverse direction across the passages, and straight surfaces in the longitudinal direction, in alignment with the gaseous flow, thus posing no interference with direct gas flow through or along the cooling surfaces.

The cooling medium can be any fluid, such as a gas or a liquid. Good temperature control within the desired range can be achieved by using a liquid whose boiling point is less than 700° C., and which at the boiling temperature is desirably under a pressure at which the boiling temperature is within the selected range. Thus, for example, boiling water under pressure can be used as the cooling medium, and the steam generated in the cooling can be withdrawn and used for heating purposes elsewhere in the system or plant, as well also as for the separation and recovery of hydrogen fluoride formed as a byproduct in the hydrolysis of the silicon fluoride.

Circulation of the cooling medium should be effected to maintain a temperature of the cooling surfaces below 700° C., and preferably below 400° C., if under rapid gas flow conditions, since then the cooling surface should be substantially below the temperature of the gaseous reaction mixture, in order to effect the necessary cooling of the gaseous reaction mixture and entrained silicon dioxide. Moreover, the colder the cooling surfaces, the more the deposition of silicon dioxide is inhibited.

On the other hand, it is important that the cooling surfaces not be cooled to a temperature below the dew point of the waste combustion gases in the gaseous reaction mixture. Otherwise, there is a risk of condensation of these gases, with corrosion of the cooling surfaces. This dew point is normally about 80° C.

The surface area of the cooling surfaces, i.e., width and length, are so selected that the gaseous reaction mixture is cooled to a temperature below 700° C. and preferably to a temperature within the range from about 500° to 150° C. in the course of transit along the cooling surfaces, and at the time of leaving the cooling surfaces.

In generating the flame reaction zone, the flame intensity should be such that from 0.1 to $1.3 \times 10^{-5}$ B.t.u.$^{-1}$ is liberated. Larger particle sizes are obtained when the flame intensity is both above and below this intensity.

It seems likely that when the intensity is lower than that, the reaction proceeds more slowly, so that growth of small particles to form large particles has time to occur.

When the intensity is above that, a part of the flame may be very hot, and a part rather cool, so that small particles which are condensed and remain in the cool parts grow larger and small particles condensed in the cool parts which happen to pass into the hot parts are volatilized.

The flame intensity and with it the reaction intensity can be controlled within the specified limits by several expedients. Many will occur to those skilled in the art, but the following are mentioned as preferable.

In the ordinary flame, the combustible gas and the gas containing the silicon fluoride are mixed in the flame zone with enough oxygen to support combustion. This technique can be used in the invention if one or more of the gases is preheated, or if the gases are mixed in the flame reaction zone with great turbulence. Otherwise, it is desirable to mix the silicon fluoride and the combustible gas together with a part or all of the oxygen-containing gas before introduction into the flame. The increase in intensity becomes quite marked when the preformed mixture contains 25% of an oxygen-containing gas.

The silicon fluoride, the combustible gas and the oxygen-containing gas can be mixed thoroughly in the flame zone, by utilizing fine jets and discharging the gases into the flame under pressure. If the jets are small and fixed to impinge on a common focus or foci the mixing will be quite thorough. A swirling motion may be imparted to the gas mixture to ensure better mixing.

It also may be convenient to mix the combustible gas and the silicon tetrafluoride and possibly some part of the oxygen-containing gas together and then discharge the mixture from a multiplicity of small jets into the flame zone. In this way small intense flames can be obtained at each jet.

The proportions of silicon fluoride to combustible gas influences the flame intensity in that a higher amount of silicon fluoride gives a lower flame intensity. Further, the amount of silicon tetrafluoride has a considerable influence in the yield of silicon dioxide in that the yield decreases with increasing amounts of silicon fluoride. Therefore it most often is suitable to use a considerable excess of the combustible gas, as is seen from the examples given below. With these factors in mind, however, the amount of silicon fluoride can be varied within wide limits. In the case of hydrogen as the combustible gas a good yield is obtained using less than approximately 0.5 g of silicon tetrafluoride to each liter of hydrogen and when commercial propane gas is used the optimum is less than about 1.5 g of silicon tetrafluoride per liter of gas; there is no lower limit except as dictated by economic reasons, because of a lowering in efficiency due to too small an amount of the fluoride to make the process practical for the amounts of gas burned.

The amount of oxygen or oxygen-containing gas also has a considerable influence on the flame intensity, in that an excess of oxygen (as compared with the theoretical amount) normally increases the intensity to a maximum, but beyond this point a further excess of oxygen-containing gas lowers the flame intensity, and renders the flame more unstable. The more intense the mixing of the gases introduced into the flame, the lower the excess of oxygen necessary in order to obtain the optimum flame intensity. In practice, an excess of 10 to 75% oxygen has proved to be preferable.

Introduction in the flame of diluting gases, for instance, nitrogen, hydrogen fluoride or water vapor, considerably decreases the flame intensity. Therefore, when inert gases are present in appreciable amounts in the flame it is necessary to provide a very intense mixing and possibly also to use preheated gases in order to obtain the flame intensity desired. If on the other hand the gases introduced in the flame are not diluted or are diluted only in part with inert gases, the flame intensity may exceed $0.1 \times 10^{-5}$ B.t.u.$^{-1}$ giving a mean particle size coarser than 50 nm.

As stated, it is possible to preheat one or more of the gases or the gas mixture before introduction into the flame zone. This alternative may be combined with any of the above procedures. The higher the temperature, the greater the effect of the preheating. However, when preheating gas mixtures containing both the silicon tetrafluoride and water vapor the temperature should be below that at which the gases will react to form silica; usually 400° C. is the threshold temperature for such a reaction.

The heat and intensity of the flame can be further increased by enclosing all or a part of the flame zone within a heat reflecting surface. Ceramic-surfaced bricks can be used, for example.

Any combination of two or more of the above procedures will further increase the flame intensity.

It is desirable to have a flame of uniform intensity throughout. To this end, a multiplicity of small flames can be used rather than one large flame, since the intensity tends to be more uniform in smaller flames. Introducing the gas mixture into the flame, whether large or small, with high turbulence also tends to increase uniformity. The more uniform the flame, the more uniform the particle size distribution of the silica, that is, the smaller the difference between the largest and the smallest particles and the mean particle size. Naturally, the uniformity will depend to an appreciable extent upon the type of burner employed.

It should be pointed out that in the region from 5 to 50 nm size particles of silica product, representing the preferred region of flame intensity, relatively large changes in the volume of oxygen-containing gas, silicon tetrafluoride and combustible gas proportions make only small changes in the particle size. However, in the region above $1.3 \times 10^{-5}$ B.t.u.$^{-1}$, i.e., the flames having a lower intensity than is required, relatively small differences in such proportions will produce large variations in particle size, and the particle size distribution will also be greater.

As the silicon fluoride, silicon tetrafluoride is preferably employed in the process of the invention. Compounds which generate the tetrafluoride in the vapor phase, such as hydrofluosilicic acid $H_2SiF_6$ and $Si_2F_6$, also can be used, and the silicon hydrofluorides, $HSiF_3$, $H_2SiF_2$ and $H_3SiF$, represent additional possibilities, although they are less readily available and much more expensive than the tetrafluoride.

The silicon tetrafluoride which is employed in the process of the invention can be generated by any of the various well-known procedures.

One method is well known and reported in the literature. Fluorite or fluorspar can be used as a source. This reacts with sulfuric acid solution and sand according to the following reaction:

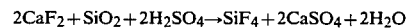

$$2CaF_2 + SiO_2 + 2H_2SO_4 \rightarrow SiF_4 + 2CaSO_4 + 2H_2O$$

When 70% sulfuric acid solution is employed and the materials are mixed and heated, silicon tetrafluoride gas is liberated and this can be mixed with a combustible gas and an oxygen-containing gas as stated above.

In British Pat. No. 438,782 another method is described involving the treatment of pulverized sand or silicates such as clay, waste glass, etc., with aqueous hydrofluoric acid, whereupon the silicon fluoride is evolved as a gas. This procedure makes possible the utilization of the reaction of the invention in a cyclic process, recycling the hydrogen fluoride liberated as a byproduct of the desired silicon-forming reaction to react again with sand to form silicon tetrafluoride. In effect, the method in this case reduces sand to the amorphous overall particle size desired for use in rubber compounding. See also Ephraim's *Inorganic Chemistry*, 4th Edition, pp. 774–781 (1943), Nordeman Publishing Co.

In another procedure, useful in a cyclic process, an aqueous solution of hydrofluoric acid is passed into a chamber filled with silica, generating a solution of fluosilicic acid $((HF)_x.SiF_4)$ where x is less than 1, 1, 2 or more. This is vaporized and reacted as described. Hydrogen fluoride and silicon tetrafluoride in the effluent from the combustion reaction can be absorbed in water or in solid sodium fluoride to form a complex sodium hydrofluoride, or in aqueous fluosilicic acid solution, and others as disclosed in the literature, and concentrated if necessary, and then again utilized for manufacturing new amounts of fluosilicic acid.

In a cyclic process utilizing solid sodium fluoride, the following reactions take place:

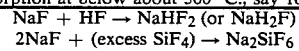

Absorption at below about 300° C., say 105° C.
$NaF + HF \rightarrow NaHF_2$ (or $NaH_2F$)
$2NaF + $ (excess $SiF_4$) $\rightarrow Na_2SiF_6$ -continued
Desorption at about 325° C. or higher, say 350° C.
NaHF$_2$ (or NaH$_2$F)→NaF + HF The hydrogen fluoride thus obtained then is recycled and again reacted with silica, usually in an aqueous solution, to form silicon tetrafluoride.

As the combustible gas in the process of the invention there can be used any gas containing hydrogen, including hydrogen itself, or if hydrogen is supplied to the flame in some other form, for instance as fluosilicic acid and water vapor, other combustible gases which do not contain hydrogen such as carbon monoxide may be used. Volatile hydrocarbons and mixtures thereof are a convenient source of supply because they are plentiful and inexpensive, and among these there can be mentioned the aliphatic, alicyclic and aromatic hydrocarbons. Examples of combustible gases are producer gas, natural gas (mostly methane and ethane), commercial propane gas (a mixture of methane, ethane, propanes and butanes), commercial butane gas, benzene, water gas (a mixture of hydrogen and carbon monoxide), kerosene, methane, ethane, naphthenes, and gasoline, all in the vapor phase.

The nature of the combustible gas is not critical, although, as will be apparent, the amount of heat liberated in combustion of the gas is important. The ranges for flame intensity set forth were computed using hydrogen, carbon monoxide and a mixture of hydrocarbons as exemplary. If the combustible gas differs greatly from these materials in the amount of heat liberated in burning with oxygen, modifications may have to be made in the operating procedure suggested. It may, for example, be desirable to mix this material with a material liberating larger amounts of heat, so that the average will closely approximate that liberated in the burning of propane or hydrogen.

As an oxygen-containing gas in the above procedures, air can be used as well as other mixtures of oxygen with inert gases, such as nitrogen and carbon dioxide, and even oxygen itself. Intensity of the flame is strongly increased if in place of air pure oxygen or an oxygen-enriched air is employed.

The gases may be preheated by external heating and eventually mixed in order to obtain a sufficiently intense flame.

The combustion chamber can be a closed reaction chamber of metal lined with fireproof brick having ceramic or metallic reflecting surfaces to increase the heat in the flame zone. Into this chamber also is conducted an oxygen-containing gas, such as air, and the combustible gas, such as natural gas or hydrogen.

In order to obtain a sufficiently intense flame many different types of burners may be used, the essential factor being that the reacting gases very quickly are brought in intimate contact with each other, thus making possible a very intense reaction.

Good results have been obtained with burners comprising a cylindrical mixing chamber in which silicon tetrafluoride, the combustible gas and air are mixed and the mixture passed through a screen or perforated plate with many fine apertures. The mixture is ignited outside the screen or plate, which prevents the flame from backfiring into the mixing chamber.

Another type of satisfactory burner is equipped with three concentric tubes, the oxygen-containing gas being supplied through the innermost and outermost tubes and the mixture of silicon tetrafluoride with a combustible gas and desirably a portion of the oxygen-containing gas is admitted through the intermediate tube. One large or a battery of small burner jets of this type can be used.

The gaseous reaction mixture and entrained silicon dioxide exiting from the cooler are then passed on to a conventional separator for removing the silicon dioxide. A conventional dust separator can be used. A series of cyclones connected in series can be used, as disclosed in U.S. Pat. No. 3,203,759.

Since the gaseous reaction mixture is not diluted with cooling gas, as in U.S. Pat. No. 3,203,759, the volume of gases that have to be passed through the silicon dioxide-removing equipment is considerably reduced, while at the same time a higher yield of silicon dioxide is obtained.

To recover the hydrogen fluoride the gases from the separator can be conducted to a conventional condenser and concentrated. The concentrated hydrofluoric acid thus obtained is returned for reuse in the treatment of fresh amounts of silica. The exhaust gases are discharged to the atmosphere. Or the hydrogen fluoride can be conducted to an absorption tower containing sodium fluoride, where it is absorbed at about 105° C., liberated later as desired by heating to 350° C. or above, and returned to form more silicon tetrafluoride.

The hydrogen fluoride and silicon tetrafluoride remaining in the gaseous reaction mixture also can be recovered in accordance with the process disclosed in U.S. Pat. No. 3,969,485.

The first stage is the absorption of the silicon- and fluorine-containing compounds from the exhaust gases in water. Hydrogen fluoride is quite water-soluble, and dissolves quickly. Silicon tetrafluoride is hydrolyzed to form hydrofluosilicic acid. In addition, if the silicon tetrafluoride concentration is high, finely-divided but undissilved silicon dioxide will also be formed in the aqueous hydrofluosilicic acid solution. Consequently, high silica fluosilicic acid may also be formed in the solution, having the approximate composition $H_2SiF_6$-$SiF_4$. The waste gases may also contain a proportion of silicon dioxide, which will remain suspended in the aqueous fluosilicic acid solution.

The absorption can be carried out at room temperature. The waste gases can be brought in contact with a spray of water, preferably flowing countercurrently to the gas flow, to improve the mixing. This type of operation is particularly adapted for a continuous process. A high enough proportion of water to waste gases is used to remove substantially all of the silicon- and fluorine-containing components thereof.

This absorption process is known, and consequently further details need not be given.

The solution of hydrofluosilicic acid and silicon dioxide or hydrogen fluoride is then reacted with sulfuric acid to form silicon tetrafluoride and hydrogen fluoride. The same products are formed from hydrofluosilic acid mixed with silicon tetrafluoride, high silica fluosilicic acid of the composition $H_2SiF_6SiF_4$, and when silicon dioxide is present as well, silicon tetrafluoride is formed also, but in this case, the byproduct is water instead of hydrogen fluoride.

The sulfuric acid does not, in fact, take part in this reaction but functions only as an absorption agent for any hydrogen fluoride or water that may be formed, besides producing an acidic reaction medium which favors the reaction.

The proportion of hydrogen fluoride to silicon tetrafluoride that is formed in this reaction depends upon the relative proportions of hydrofluosilicic acid and silicon tetrafluoride in the reaction mixture. Whereas hydrofluosilic acid forms two mols of hydrogen fluoride for each mol of silicon tetrafluoride, in the presence of equimolar quantities of hydrofluosilicic acid and silicon tetrafluoride equimolar quantities of silicon tetrafluoride and hydrogen fluoride are formed, while in the presence of $SiO_2$ the formation of hydrogen fluoride is suppressed. Thus, by varying the proportions of these components in the reaction mixture, any desired ratio of silicon tetrafluoride by hydrogen fluoride can be produced in this reaction stage. Thus, the proportions of silicon tetrafluoride to hydrogen fluoride in the reaction product can be closely controlled, as may be desirable.

The reaction between hydrofluosilicic acid and sulfuric acid is preferably carried out in a reactor which is equipped with a stirrer. The amount of concentrated sulfuric acid is so adjusted that the reaction mixture contains from about 60 to about 90%, preferably from about 65 to about 75%, sulfuric acid by weight. The reaction may be carried out at an elevated temperature within the range from about 50° to about 150° C.

Silicon tetrafluoride is a gas, as also is hydrogen fluoride, and both gases are readily liberated from the aqueous reaction solution, particularly at elevated temperatures within the stated range. The gas mixture liberated from the reaction mixture also contains water vapor. To separate silicon tetrafluoride from hydrogen fluoride and water, the gases from the reaction mixture may suitably be passed through a scrubber, in which they are brought into contact with the entering concentrated sulfuric acid. Some silicon tetrafluoride dissolves in the entering acid, and thus increases the silicon tetrafluoride concentration of the entering sulfuric acid but the acid also absorbs substantially all of the hydrogen fluoride and water vapor in the gas, and a stream of relatively pure silicon tetrafluoride can be separated from the acid in the scrubber.

In the apparatus shown in the drawing, combustible gas, silicon tetrafluoride and air are fed via lines 1, 2, 3, in the proper proportions to the array of burners 4. The burners are constructed with annular jackets 5 for secondary air fed via line 7, and the combustion process is carried out in accordance with the procedure described above.

The burner array 4 is contained within the reaction chamber 8 of the reactor 9 defining a flame reaction zone in the flame regions. From this zone, the gaseous reaction mixture containing entrained silicon dioxide passes to the cooler 10. The cooler is composed of an array of straight and smooth-surfaced cooling tubes 11 having a diameter of from 20 to 150 mm, in this case 50 mm, and a length of from 1 to 6 meters, in this case, 2.5 meters. The gaseous reaction mixture passes through the open centers 12 of these tubes. The manifold 13 on the outside of the tubes carries a cooling medium, in this case, boiling water kept under a superatmospheric pressure of six bars at a temperature of about 160° C., entering at inlet 14 and exiting with steam at outlet 15. The gaseous reaction mixture passes from the flame reaction zone 8 into the tubes 11 within one second, and during passage through the tubes is cooled to a temperature within the range of from 200° to 700° C., depending on the gas flow rate, and the rate of circulation of the boiling water. The entire transit time through the cooler tube array is less than one second.

From the cooler 10 the gaseous reaction mixture passes to three cyclones 16, 17, 18, arranged in series, in which the silicon dioxide is centrifugally separated out and recovered via the line 19, while the residual gases escape through the line 20, and pass to an absorption tower (not shown) in accordance with U.S. Pat. No. 3,969,485, where the hydrogen fluoride content and the silicon tetrafluoride content thereof are recovered by absorption.

The following Example illustrates a preferred embodiment of the invention:

EXAMPLE

The apparatus shown in the FIGURE was used in this Example. The following gas flows were fed to the burners:

| | |
|---|---|
| Fuel gas (89.0% $H_2$ + 11.0% $CH_4$) | 1170 m$^3$/h 20° C. |
| Silicon tetrafluoride | 149 m$^3$/h 20° C. |
| Air | 3258 m$^3$/h 20° C. |

The gaseous reaction mixture containing entrained silicon dioxide was passed from the flame reaction zone through the tubes 11 of the cooler and cooled to 620° C. during passage. In this case, the cooler was composed of straight tubes with an internal diameter of 40 mm and a length of 3 meters. The gas flowed through the tubes at an initial velocity of 55 meters per second, corresponding to a Reynolds number of 6200.

The tubes were cooled by passing boiling water through the manifold of the cooler, kept at a superatmospheric pressure of six bars, and corresponding to a temperature of 160° C. of the steam flowing out from the cooler.

The gaseous reaction mixture containing entrained silicon dioxide then passes through the three cyclones 16, 17, 18 connected in series, where the silicon dioxide was continuously separated. A yield of 316 kg silicon dioxide per hour was recovered in the cyclone separators and this silicon dioxide had the following properties.

| | |
|---|---|
| Specific surface area | 212 m$^2$/g |
| Thickening number | 193 m$^2$/g |
| Grits content | 31 ppm |

The thickening number of this silicon dioxide was determined in accordance with the following procedure:

1 part by weight silicon dioxide is mixed with 100 parts by weight of liquid polyester using a colloid mill. The viscosity of the resulting mixture was measured using a Brookfield viscosimeter LVT at 12 revolutions per minute at 25° C. The viscosity of a mixture of liquid polyester and normal silicon dioxide prepared, by the standard procedure of U.S. Pat. No. 2,819,151, was used as a standard.

The thickening number was then calculated, using the following relation:

$$\text{Thickening number} = \frac{\text{viscosity of the test sample} \times 100}{\text{viscosity of the standard sample}}$$

Normal silicon dioxide prepared in accordance with U.S. Pat. No. 2,819,151 has a thickening number within the range from 60 to 120. Thus, the thickening number of 193 for the silicon dioxide prepared using the process and apparatus of the invention shows a considerable improvement. It is apparent that the quality of the silicon dioxide produced is good, that there is a low content of hard material or grits collected on and detached from the walls of the cooling tubes, and that the production rate of the apparatus is quite high. The yield was 85% of the stoichiometric yield.

A comparison was made with silicon dioxide prepared using the process of U.S. Pat. No. 3,203,759, diluting the gaseous reaction mixture with combustion gases in the same burner chamber, and the same cyclone array shown in the FIGURE. The production rate was 108 kg silicon dioxide per hour. The silicon dioxide obtained had a specific surface area of 210 $m^2/g$, and a thickening number of 116. The yield of silicon tetrafluoride to silicon dioxide was 70%.

The superiority in the process of the invention to this process is apparent from the results of this test.

Having regard to the foregoing disclosure, the following is claimed as the patentable and inventive embodiments thereof:

1. A process for preparing finely-divided silicon dioxide in good yield which comprises reacting a silicon fluoride in the vapor phase with water vapor, combustible gas and free oxygen-containing gas in a flame reaction zone to form hydrogen fluoride and silicon dioxide entrained in a gaseous reaction mixture; withdrawing the gaseous reaction mixture from the flame reaction zone; and then immediately and rapidly cooling the gaseous reaction mixture and entrained silicon dioxide to a temperature below 700° C. by passing the gaseous reaction mixture in turbulent flow at a Reynolds number above 300 under constraint through a plurality of passages all of which consist of straight passages in alignment with the gas flow, the passages having a diameter within the range from about 20 to about 150 mm and smooth walls constituting cooling surfaces.

2. A process according to claim 1 in which the silicon fluoride is silicon tetrafluoride.

3. A process according to claim 1 in which the passages are tubular.

4. A process according to claim 1 in which the passages are defined by parallel plates.

5. A process according to claim 1 in which the gaseous reaction mixture passes through the passages in a transit time of less than ten seconds.

6. A process according to claim 1 in which the gaseous reaction mixture passes through the passages in a transit time of less than one second.

7. A process according to claim 1 in which the cooling surface is cooled by circulating boiling water.

* * * * *